United States Patent Office 3,524,516
Patented Aug. 18, 1970

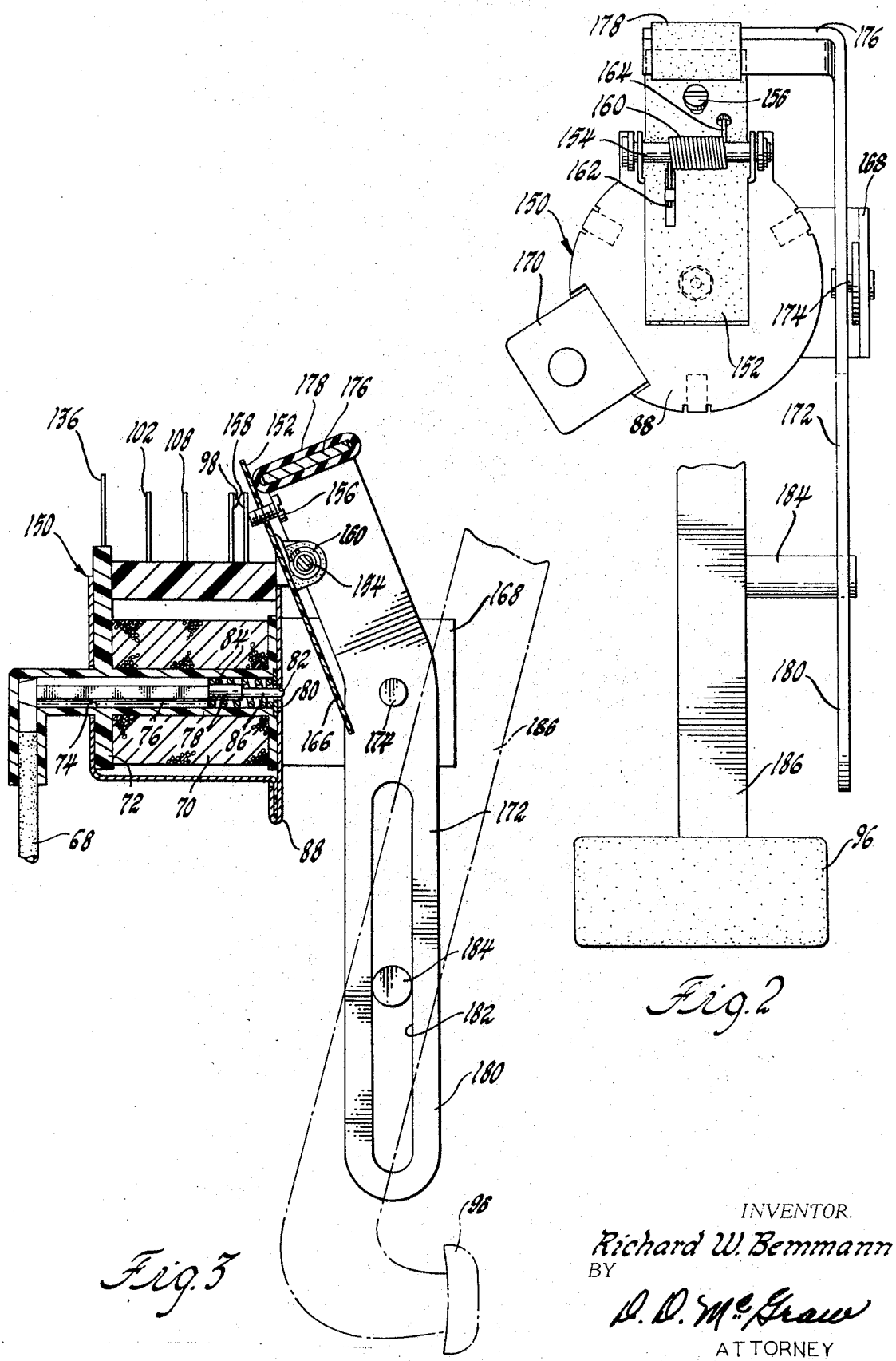

3,524,516
CRUISE RELEASE SOLENOID VALVE
Richard W. Bemmann, Flint, Mich., assignor to General Motors Corporation, Detroit, Mich., a corporation of Delaware
Filed July 23, 1968, Ser. No. 746,990
Int. Cl. B60k 31/00
U.S. Cl. 180—108                   5 Claims

ABSTRACT OF THE DISCLOSURE

A vehicle road speed control system in which a vacuum actuated servomotor is controlled to move the engine throttle valve as necessary to correct vehicle speed errors from a set speed as the road load changes. The system has a control valve controlling atmospheric air bleed to the servomotor in accordance with the set vehicle speed and the actual vehicle speed. Manual controls for this system include a control switch and the brake pedal, with the control switch permitting energization and causing de-energization of a solenoid coil actuating a first control valve, and the brake pedal when actuated opening a switch controlling the first solenoid coil as well as a second solenoid coil which controls an atmospheric vent valve. Further brake pedal actuation will mechanically insure opening of the atmospheric vent valve to de-energize the system.

---

The invention relates to a vehicle road speed control system similar to that disclosed in U.S. Ser. No. 584,605, filed Oct. 5, 1966 (now Pat. No. 3,419,105) and assigned to the common assignee. The invention more particularly relates to such a system in which a solenoid actuated atmospheric vent valve is closed when the vehicle road speed control system is energized and in which the brake pedal when actuated opens a normally closed switch to de-energize the solenoid holding the atmospheric vent valve closed and upon further actuation causes mechanical release of the atmospheric vent valve to insure the admission of full atmospheric pressure into the system.

In the drawings:

FIG. 2 is an elevation view of a modification of the brake release control assembly utilized in the system of FIG. 1; and FIG. 3 is a cross section view of the brake release control assembly of FIG. 2, with parts broken away.

Figure 1:
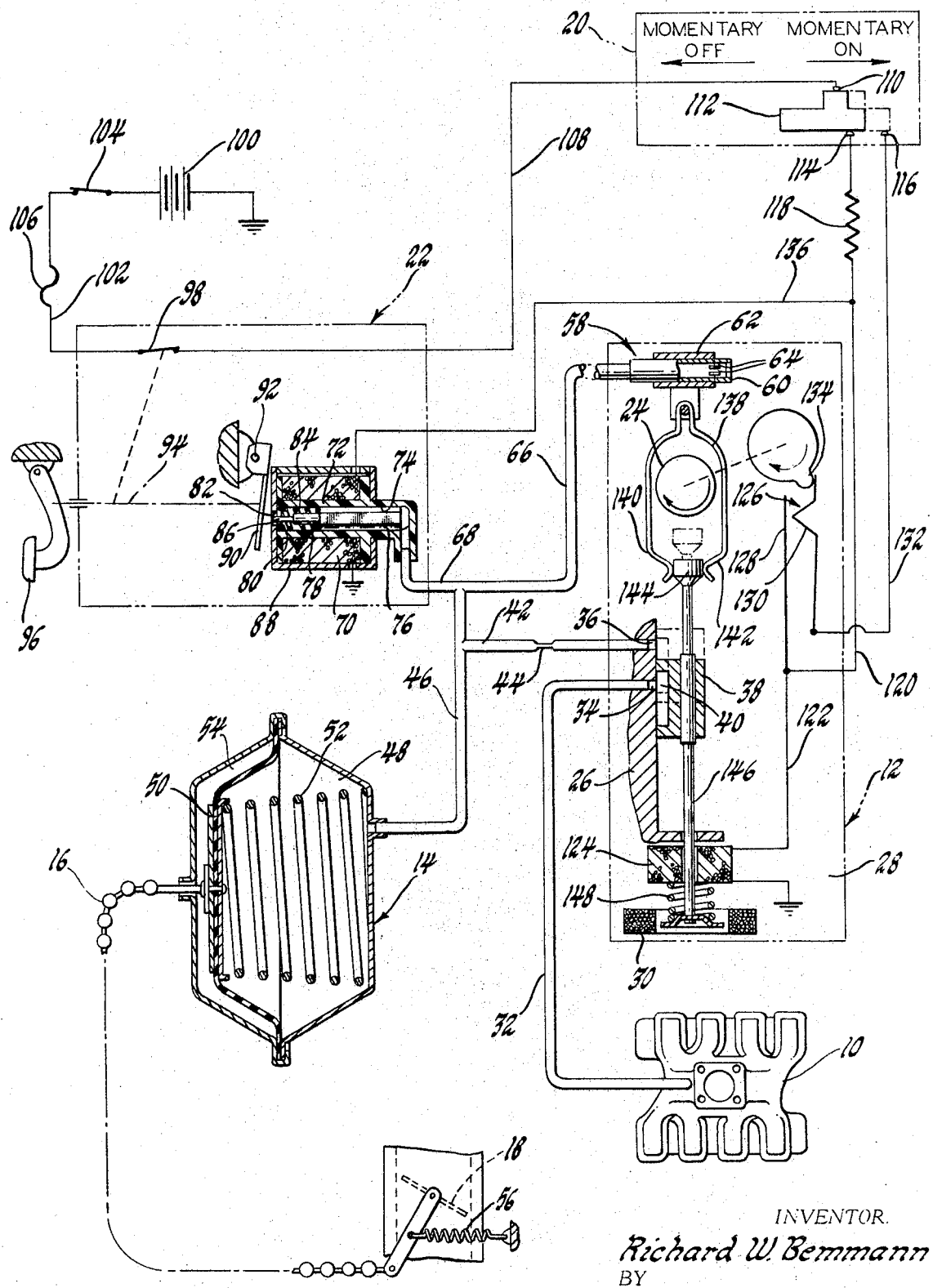
FIG. 1 is a schematic representation of a system embodying the invention, with parts broken away in section, and showing the system in the de-energized condition.

The system illustrated in FIG. 1 is closely related to the system disclosed and claimed in the above-identified application and operates in a similar manner. The system has basic elements including the engine intake manifold 10 as a source of subatmospheric pressure, a speed transducer assembly 12, a servomotor 14 connected by the chain 16 to the engine throttle valve 18, the control switch assembly 20, and the brake release control assembly 22.

The speed transducer 12 has a drum 24 suitably driven by a speedometer type vehicle road speed pickup to move arcuately in accordance with vehicle speed, with the speed increasing direction being indicated by the arrows on the drum 24. This type of transducer is more particularly disclosed in the above-identified application and therefore reference is made to that application for this purpose. The transducer housing 26 has a chamber 28 which is at atmospheric pressure, with atmospheric air entering the chamber through the air filter 30. The conduit 32 connects the intake manifold 10 with the port 34 formed in the housing 26. Another port 36 is positioned adjacent port 34 so that slide valve 38 can be moved to either close off port 34 and connect port 36 with chamber 28, as shown, or connect ports 34 and 36 through the valve chamber 40. Conduit 42 is connected with port 36 and contains a fixed orifice restriction 44. The other end of conduit 42 is connected to a conduit 46, one end of which is connected to the variable pressure chamber 48 of the servomotor 14. Chamber 48 has a movable wall formed by the diaphragm 50 to which the chain 16 is connected for tensile movement. Spring 52 urges diaphragm 50 leftwardly, as seen in FIG. 1, against the force of atmospheric pressure in the servomotor atmospheric pressure chamber 54 and in the throttle valve closing direction. When the absolute pressure in chamber 48 decreases sufficiently so that the pressure differential across the diaphragm overcomes the force of spring 52, chain 16 is tightened and opens the throttle valve 18 against the force of the throttle valve closing spring 56.

The control valve assembly 58 is a part of the transducer 12 and includes an orifice section 60 with the control valve 62 movable to control the effective areas of the orifices 64. The interior of the orifice section 60 is connected to conduit 66 which is also connected to conduit 46. Air at atmospheric pressure is admitted to conduit 66 under control of valve 62, with the air being received from the housing chamber 28.

Another conduit 68 also connects with conduit 46 and is connected to the brake release control assembly 22. Assembly 22 has a solenoid coil 70 on a spool 72 which also provides the pneumatic connection with conduit 68. The center of the spool has a bore 74 receiving the solenoid core 76. In the particular construction shown, bore 74 is round and core 76 is made of hexagonal bar stock. Therefore air can pass between the sides of the core 76 and the wall of bore 74. One end of core 76 is formed to provide valve 78 which is engageable with the valve seat 80 to close atmospheric vent port 82. Spring 84 urges the valve 78 to the open or off position. A suitable pin 86, which may be formed as a part of core 76 or as a separate pin attached thereto, extends through port 82 slightly when the valve is in the open position and extends well above the solenoid housing 88 in which port 82 is formed when the valve 78 is seated against valve seat 80. In the construction shown in FIG. 1, member 90 is pivotally mounted at 92 so that it is engageable with pin 86 when the valve 78 is in the closed or on position and can be mechanically moved to move the valve to the open position. A suitable mechanical connection 94 connects member 90 with the brake pedal assembly 96. The normally closed switch 98 is also a part of the brake release control assembly 22 and is mechanically connected to be opened by brake pedal actuating movement.

The electrical portion of the system includes a suitable source of electrical power schematically illustrated as battery 100, with electrical lead 102 containing ignition switch 104 and fuse 106 and connected to one side of normally closed switch 98. The other side of switch 98 is connected by electrical lead 108 to the control switch assembly 20, and more particularly to contact 110 of that assembly. Switch assembly 20 has a slide bar 112 which is manually movable to the left to electrically disconnect contact 110 from the bar. However, bar 112 is biased to the center position shown in solid lines in FIG. 1. The bar is also electrically engaged with contact 114 at all times. When the bar is moved to the right as seen in FIG. 1 it also electrically engages contact 116. Contact 114 is connected through resistor 118 and electrical lead 120 to electrical lead 122, which in turn is connected to solenoid coil 124. A minimum speed switch 126 has contacts 128 and 130, with contact 128 being connected to electrical lead 122 and contact 130 being connected to electrical lead 132, which is also connected to the control switch assembly contact 116. As is schematically illustrated, a projection 134 on drum 24 moves to permit contact 130 to engage contact 128 when the drum has moved arcuately a distance which determines the minimum speed at which the system can be energized. Electrical lead 136 is connected to lead 120 intermediate resistor 118 and lead 122 and also to the solenoid coil 70 of the brake release control assembly 22. Therefore solenoid coils 70 and 124 are electrically connected in parallel so that both are energized and de-energized at the same time and under the same conditions.

Drum 24 forms a part of a clutch arrangement which is utilized to determine the desired speed at which the system is to control the vehicle. The other part of the clutch includes the clutching member 138 having clutch arms 140 and 142 extending on either side of the drum 24. A cam 144 attached to the armature rod 146 normally holds the clutch arms away from the drum 24, in the position shown. Armature rod 146 extends through solenoid coil 124 and is also connected to valve 38. When coil 124 is energized cam 144 moves to the dashed line position illustrated, allowing spring clutch arms 140 and 142 to grip the periphery of drum 24 and set an angular relationship between the clutching member 138 and the drum 24 which is indicative of the desired speed. Clutching member 138 is suitably connected to control valve 62 to move that valve with changes in vehicle speed from the desired speed so that it controls the effective orifice areas of orifices 64. The upward movement of armature 146 also moves valve 38 upwardly to connect ports 34 and 36 through valve chamber 40 and therefore provide subatmospheric pressure to the system through conduit 42.

In order to energize solenoid coils 70 and 124, the control switch slide bar 112 is moved to the right to electrically connect contacts 110 and 116, thereby electrically energizing solenoid coil 124 through switch 126 and electrical leads 132 and 122. Solenoid coil 70 is energized through electrical lead 132, switch 126, and electrical leads 122, 120, and 136. The energization of solenoid coil 70 causes the core 76 to move to close valve 78 against its seat 80, therefore preventing atmospheric pressure from entering the system through conduit 68. At the same time the speed transducer is energized at a set speed. Changes in vehicle speed from the set speed cause control valve 62 to increase or decrease atmospheric air bleed into the system, thereby moving diaphragm 50 as necessary to change the position of the throttle valve 18 to maintain the vehicle road speed substantially at the set speed. Upon manual release of the slide bar 112, it will return to the center position shown, and keep the solenoids energized through the holding circuit containing resistor 118.

When the system is to be de-energized, control switch slide bar 112 may be moved to the left to electrically disconnect contacts 110 and 114. This will electrically de-energize solenoid coils 70 and 124 by releasing the holding circuit. Once released, resistor 118 prevents sufficient current to go to the solenoid coils to displace the cores or armatures. The same result may be obtained by brake actuating movement of the brake pedal assembly 96 to open switch 98. Further brake actuating movement of assembly 96 will move member 90 toward pin 86 and, if the valve 78 should remain seated, will mechanically move the valve to the open or off position. This will insure full atmospheric air bleed into conduit 68 and to servomotor variable pressure chamber 48 through conduit 46 without requiring it to flow through a restriction such as orifice 44. With atmospheric pressure on both sides of diaphragm 50, spring 52 will move the diaphragm to the left as seen in FIG. 1, thereby permitting throttle valve 18 to be moved in the throttle valve closing direction by spring 56. De-energization of solenoid coil 124 also permits spring 148 to move armature 146 downwardly, moving valve 38 and cam 144 downwardly and thereby connecting port 36 with atmospheric air in chamber 28 and disconnecting the clutching member 138 from the drum 124. The servomotor is therefore also connected with atmosphere through conduit 42. The system is de-energized, full control of the throttle valve 18 is returned to the vehicle operator, and he may operate the throttle valve in a normal manner through the accelerator pedal.

The brake release control assembly 22 in FIG. 1 has direct mechanical connections such that movement of the brake pedal assembly 96 in the brake actuating direction opens switch 98 and, when sufficient brake applying movement occurs, mechanically engages member 90 and pin 86 to insure opening of valve 78. The brake release control assembly 150 of FIGS. 2 and 3 is a modified assembly which may be used in the system of FIG. 1 in the same manner as assembly 22. Assembly 150 has many elements substantially identical to the elements of assembly 22, and the same reference characters identify such elements. In this assembly, the vehicle brake pedal movement controlled member 152 is mounted by pivot pin 154 on the housing 88 and includes an adjusting screw 156 in one end of the member which engages a spring contact 158 of switch 98. A torsion spring 160 is wrapped about pivot pin 154 and has one end 162 secured to the housing 88 and the other end 164 extending through an aperture in member 152 so that the member 152 is spring biased to pivot in the clockwise direction as seen in FIG. 3. This bias force tends to remove adjusting screw 156 from contact 158 so that switch 98 will be opened. The bias force also tends to bring the end 166 of member 152 into engagement with the end of pin 86 so that the spring force is capable of mechanically moving valve 78 away from its seat 80.

The assembly is suitably supported by support bracket 168 and mounting tab 170 and has a lever 172 mounted on bracket 168 by pivot pin 174. The arm 176 of lever 172 extends to a position adjacent the end of member 152 having the adjusting screw 156 therein and is provided with a cushion 178 through which the arm engages member 152. The other end 180 of lever 172 is slotted at 182 to receive the brake pedal assembly pin 184. This pin is mounted on the pedal arm 186 of the brake pedal assembly 96 so that when the brake pedal assembly is moved in the brake applying direction lever 172 will be pivoted clockwise as seen in FIG. 3, permitting spring 160 to move member 152 clockwise, opening switch 98. Further brake pedal movement in the brake applying direction will move arm 176 sufficiently far so that member 152 engages pin 86 if valve 78 has not yet been moved to the off position by spring 84 upon de-energization of solenoid coil 70, thus mechanically insuring the atmospheric venting of conduit 68 by opening valve 78. When the brake pedal assembly is released, the brake pedal is returned to its released position and acts through pin 184 and lever 172 to pivot member 152 counterclockwise against the force of spring 160 and to return the assembly to the position shown in FIG. 3. Thus switch 98 is again closed and remains closed so long as the brake pedal assembly remains in the brake released position.

What is claimed is:
1. In a vehicle road speed control system for a vehicle having a brake pedal:
 a pneumatic pressure control circuit,
 a first movable valve having an off position venting said circuit to atmosphere and an on position closing the atmospheric vent and connecting said circuit to a source of subatmospheric pressure,
 a first solenoid coil having a first core connected to move said first valve from the valve off position to the valve on position when said first solenoid coil is energized,
 a first spring continuously urging said first core and said first valve toward the valve off position and being overcome by the force of said solenoid coil when said solenoid coil is energized, a second movable valve having an off position venting said circuit to atmosphere and an on position closing the atmospheric vent, a second solenoid coil having a second core connected to move said second valve from the valve off position to the valve on position when said second solenoid coil is energized, a second spring continuously urging said second core and said second valve to the valve off position and being overcome by the force generated by said second coil when said second coil is energized, a vehicle brake pedal movement controlled member, an electrical circuit controlling said first and second solenoids and having a normally closed switch opened by said brake pedal movement controlled member by brake applying movement of said brake pedal to de-energize said first and second solenoid coils, said second valve being mechanically engageable by said brake pedal movement controlled member upon further brake applying movement of said brake pedal to mechanically move said second valve to the off position when said second spring has not moved said second valve to the off position upon brake actuation.

2. The invention defined by claim 1 in which said first and second solenoid coils are in electrical parallel in said electrical circuit.

3. The invention defined by claim 1 in which said pneumatic pressure control circuit has a conduit with a first branch communicating with a variable orifice selectively venting atmospheric pressure to said conduit in accordance with vehicle road speed and a set speed, a second branch communicating with said second valve, a third branch communicating with a servomotor variable pressure chamber, and a fourth branch having a restrictive fixed orifice therein and communicating with said first valve.

4. The invention defined by claim 1 in which said vehicle brake pedal movement controlled member is spring biased to open said normally closed switch and to engage said second valve and said brake pedal in the brake released position opposes the spring bias of said member.

5. The invention defined by claim 1 in which said vehicle brake pedal movement controlled member is mechanically connected to said brake pedal so that brake applying force moving said brake pedal also opens said normally closed switch and moves said second valve to the off position.

References Cited

UNITED STATES PATENTS

| | | | |
|---|---|---|---|
| 3,183,994 | 5/1965 | Goerke et al. | 180—108 |
| 3,207,252 | 9/1965 | Cripe et al. | 180—108 |
| 3,268,026 | 8/1966 | MacDuff et al. | 180—108 X |
| 3,410,361 | 11/1968 | Marie | 180—108 |

KENNETH H. BETTS, Primary Examiner

U.S. Cl. X.R.

123—103